(12) United States Patent
Xie et al.

(10) Patent No.: US 9,644,062 B2
(45) Date of Patent: May 9, 2017

(54) POLYMER PARTICLE DISPERSIONS WITH POLYOLS

(71) Applicant: Dow Global Technologies LLC, Midland, MI (US)

(72) Inventors: Rui Xie, Pearland, TX (US); Jeanette K. Nunley, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/426,410

(22) PCT Filed: Oct. 17, 2013

(86) PCT No.: PCT/US2013/065404
§ 371 (c)(1),
(2) Date: Mar. 6, 2015

(87) PCT Pub. No.: WO2014/062903
PCT Pub. Date: Apr. 24, 2014

(65) Prior Publication Data
US 2015/0218299 A1    Aug. 6, 2015

Related U.S. Application Data

(60) Provisional application No. 61/715,923, filed on Oct. 19, 2012.

(51) Int. Cl.
| | | |
|---|---|---|
| *C08L 9/00* | (2006.01) | |
| *C08L 51/04* | (2006.01) | |
| *C08L 63/00* | (2006.01) | |
| *C08L 63/02* | (2006.01) | |
| *C08L 63/04* | (2006.01) | |
| *C08L 67/02* | (2006.01) | |
| *C08L 67/04* | (2006.01) | |
| *C08L 71/02* | (2006.01) | |
| *C08F 283/10* | (2006.01) | |
| *C08J 5/24* | (2006.01) | |
| *C08G 59/24* | (2006.01) | |
| *C08G 59/42* | (2006.01) | |
| *C08G 59/50* | (2006.01) | |

(52) U.S. Cl.
CPC .......... *C08F 283/10* (2013.01); *C08G 59/245* (2013.01); *C08G 59/4238* (2013.01); *C08G 59/5026* (2013.01); *C08J 5/24* (2013.01); *C08L 9/00* (2013.01); *C08L 51/04* (2013.01); *C08L 63/00* (2013.01); *C08L 63/04* (2013.01); *C08L 67/02* (2013.01); *C08L 67/04* (2013.01); *C08L 71/02* (2013.01); *C08J 2363/00* (2013.01); *C08L 2205/05* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 4,632,960 A | 12/1986 | Sato et al. | |
| 4,778,851 A | 10/1988 | Henton et al. | |
| 6,037,392 A | 3/2000 | Tang et al. | |
| 6,111,015 A | 8/2000 | Eldin et al. | |
| 6,287,745 B1 * | 9/2001 | Yamamura | G03F 7/0037 430/269 |
| 7,485,680 B2 | 2/2009 | Furukawa et al. | |
| 8,541,512 B2 | 9/2013 | Schoenfeld et al. | |
| 8,927,677 B2 | 1/2015 | Karunakaran et al. | |
| 2010/0204404 A1 | 8/2010 | Hongo | |
| 2011/0114972 A1* | 5/2011 | Sato | C08G 59/24 257/88 |
| 2015/0252183 A1* | 9/2015 | Xie | C09D 109/00 523/438 |
| 2015/0299457 A1* | 10/2015 | Fu | C08L 63/00 428/626 |

FOREIGN PATENT DOCUMENTS

| | | |
|---|---|---|
| JP | 5295237 | 11/1993 |
| JP | 6107910 | 4/1994 |
| JP | 2751071 B2 | 5/1998 |
| JP | 2011-14888 A * | 8/2011 |
| KR | 2005-049127 A * | 5/2005 |
| WO | 2014/062903 A1 | 4/2014 |

OTHER PUBLICATIONS

Harani et al. Toughening of Epoxy Resin Using Hydroxyl-Terminated Polyesters, J Applied Polymer Sci, 1999 V 71, pp. 29-38.
Isik et al. Impact ModifiedEpoxy/Montmorillonite Nanocomposites: Synthesis and Characterization, Polymer 2003 V 44, pp. 6371-6377.
PCT/US2013/065404, International Search Report and Written Opinion. Mailed Feb. 6, 2014.
PCT/ /US2013/065404,International Preliminary Report on Patentability. Mailed Apr. 30, 2015.

* cited by examiner

*Primary Examiner* — Robert Sellers (57) ABSTRACT

A toughener composition comprising: a) a polyol component selected from the group consisting of a polyether polyol, a polyester polyol, a polycaprolactone polyol, a hydroxyl-terminated polybutadiene, and mixtures or copolymers thereof; and b) a core shell rubber comprising a rubber particle core and a shell layer wherein said core shell rubber has a particle size of from 0.01 μm to 0.5 μm is disclosed. The toughener can be used in epoxy resin compositions for composite applications.

13 Claims, 1 Drawing Sheet

POLYMER PARTICLE DISPERSIONS WITH POLYOLS

BACKGROUND OF THE INVENTION

Field of the Invention

The present invention is related to epoxy thermosets. More particularly, the present invention is related to tougheners for epoxy thermosets.

Introduction

Epoxy thermosets are inherently brittle due to their highly cross-linked polymer network. Such a drawback has resulted in limited use of epoxy resins in many demanding applications where toughness is required. In recent years, new developments in composites, coatings, and electronics require epoxy thermosets with greater thermal stability. Increasing the thermal stability of the epoxy polymer network often requires further tightening of the polymer network with increased crosslink density, resulting in a much more brittle polymer network.

Among the methods for solving the problems, it has been attempted to blend a rubbery ingredient with an epoxy resin. Examples of these methods include (1) heating partially cross linked rubbery random copolymer particles prepared by emulsion polymerization using a nonionic emulsifier or the like to a temperature higher than the cloud point of the emulsifier, thereby coagulating them, then optionally washing the coagulate with water and mixing the same with an epoxy resin, (2) mixing a rubbery polymer latex and an epoxy resin and then evaporating off the water content to obtain a mixture, and (3) mixing a rubbery polymer latex with an epoxy resin under the presence of an organic solvent to obtain a mixture.

The methods of (1) and (2) described above are methods of dispersing polymer particles that are adhered to each other by coagulation in a viscous epoxy resin. Since the rubbery polymer particles are physically bonded to each other, pulverization or a re-dispersion operation with a considerably large mechanical shearing force is required upon mixing with the epoxy resin. The higher viscosities of the epoxy resins often make it more difficult to uniformly re-disperse the rubbery polymer particles. As a result, such processes may leave an unmixed portion, and lumpy agglomerations are sometimes formed in the unmixed portion. Furthermore, addition of polymer particles to the viscous epoxy resin often leads to a further increase in viscosity, resulting in difficulties using the dispersions. Use of epoxy reactive diluents in place of liquid epoxy resins can significantly reduce viscosity of the dispersions, but it is usually accompanied by sacrificing other properties, such as thermal stability, mechanical strength and chemical resistance.

Method (3) described above does not include a coagulating operation, so an epoxy resin composition with rubbery polymer particles dispersed uniformly can be obtained, but a great amount of water content present together with the organic solvent in the system must be separated or evaporated off. Separation of the organic solvent layer and the aqueous layer can require as long one day and one night. Additionally, the organic solvent layer and the aqueous layer are difficult to separate substantially since they form a stable emulsified suspension. Further, in a case of removing the water content by evaporation, a great amount of energy is necessary and, in addition, water soluble impurities such as an emulsifier or sub-starting materials usually used in the production of rubbery polymer latexes remain in the composition to degrade the quality.

Therefore, a need exists for a toughening system with low viscosity that provides a uniform distribution of rubbery particles in an epoxy thermoset matrix.

SUMMARY OF THE INVENTION

In an embodiment of the present invention, there is disclosed a composition comprising, consisting of, or consisting essentially of: a) a polyol component comprising a polyol with an average molecular weight of from 2000 to 12000 and an average functionality of 1.5 to 6; and b) a core shell rubber comprising a rubber particle core and a shell layer wherein said core shell rubber has a particle size of from 0.01 µm to 0.5 µm.

DETAILED DESCRIPTION OF THE INVENTION

Polyol Component

Generally, the polyol component comprises a polyol or a mixture of polyols with an average molecular weight of from 2000 to 12000, from 3000 to 100000 in another embodiment, and from 4000 to 8000 in yet another embodiment. In the case that the average molecular weight of the polyol is less than 2000, incorporation of such polyol in the epoxy systems may lead to lower thermal and mechanical properties. In the event that the molecular weight of the polyol is greater than 12000, the processing characteristics of the dispersion may be negatively impacted.

Generally, the average functionality of the polyol component is in the range of from 1.5 to 6.0. The average functionality of the polyol component is in the range of 1.8 to 5.0 in another embodiment, and is in the range of from 2.0 to 4.0 in yet another embodiment. If the functionality of the polyol is less than 1.5, incorporation of the polyol in the epoxy network may result in poor thermal and mechanical properties. If the functionality is more than 6.0, incorporation of the polyol in the epoxy network may lead to poor crack resistance.

In an embodiment, the polyol component comprises a polyol containing at least 5 weight percent of ethylene oxide. The ethylene oxide is in the form of end capping in an embodiment and can be a segment of a block copolymer in another embodiment.

Examples of the polyol component include, but are not limited to polyether polyols, such as polypropylene oxide, polybutylene oxide, polyethylene oxide, and polytetramethylene ether glycol commercially available from the Dow Chemical Company as VORANOL® polyols, from the Arch Chemical Company as Poly G® glycol, from Invista as TERATHANE®, and from the Bayer Corporation ACCLAIM® polyol, polyester polyols, such as polyethylene adipate, polybutylene adipate, polypropylene adipate, polyethylene propylene adipate, polyethylene butylene adipate, and the like, mixtures and copolymers thereof commercially available from Chemtura as FOMREZ® polyester polyols, and from the Dow Chemical Company as DIOREZ® polyester polyols, a polycaprolactone polyol, such as CAPA® caprolactone polyols from PERSTROP and PLACCEL® caprolactone polyols from DAICEL, hydroxyl-terminated polybutadienes, such as KRASOL® from SARTOMER, and mixtures and copolymers of the above.

In an embodiment, the polyol component is a copolymer of an epoxy phobic block and an epoxyphilic block. Examples of copolymer polyols include but are not limited to ethylene oxide-propylene oxide block copolymers, ethylene oxide-butylene oxide block copolymers, ethylene oxide end-capped propylene oxide polyols, ethylene oxide end-capped butylene oxide polyols, and combinations thereof. In an embodiment, the ethylene oxide content in the block copolymer is from 15 weight percent to 75 weight percent, from 30 weight percent to 60 weight percent in another embodiment, and from 35 weight percent to 50 weight percent in yet another embodiment.

Core Shell Rubber

The second component is a core shell rubber comprising a rubber particle core and a shell layer. The core shell rubber generally has a particle size in the range of from 0.01 µm to 0.8 µm. The core shell rubber has a particle size in the range of from 0.05 µm to 0.5 µm, in another embodiment, and in the range of from 0.08 µm to 0.30 µm in yet another embodiment.

The core shell rubber is a polymer comprising a rubber particle core formed by a polymer comprising an elastomeric or rubbery polymer as a main ingredient, optionally an intermediate layer formed with a monomer having two or more double bonds and coated on the core layer, and a shell layer formed by a polymer graft polymerized on the core. The shell layer partially or entirely covers the surface of the rubber particle core by graft polymerizing a monomer to the core.

In an embodiment, the polymer constituting the rubber particle core is crosslinked and has limited solubility in the polyol component. In an embodiment, the rubber particle core is insoluble in the polyol component. Further, the rubber content in the rubber particle core is generally in the range of from 60 weight percent to 100 weight percent, 80 weight percent to 100 weight percent in another embodiment, 90 weight percent to 100 weight percent in another embodiment and 95 weight percent to 100 weight percent in yet another embodiment.

Generally, the polymer constituting the rubber particle core has a glass transition temperature (Tg) of 0° C. or lower and −30° C. or lower in another embodiment. In an embodiment, the polymer constituting the rubber particle core is made from elastomeric material comprising from 50 weight percent to 100 weight percent of at least one member selected from diene monomers (conjugated diene monomers) and (meth)arcylic acid ester monomers and 0 to 50 weight percent of other copolymerizable vinyl monomers, polysiloxane type elastomers or combinations thereof. The term '(meth)acryl' is defined as acryl and/or methacryl.

The diene monomer (conjugated diene monomer) constituting the elastomeric material can include but is not limited to, for example, butadiene, isoprene and chloroprene. In an embodiment, butadiene is used. Further, the (meth)acrylic ester monomer can include, for example, butyl acrylate, 2-ethylhexyl acrylate and lauryl methacrylate. In another embodiment, butyl acrylate or 2-ethylhexyl acrylate can be used. They can be used alone or in combination.

Further, the above-mentioned elastomeric materials of a diene monomer or (meth)acrylate ester monomer can also be a copolymer of a vinyl monomer copolymerizable therewith. The vinyl monomer copolymerizable with the diene monomer or (meth)arcylic ester monomers can include, for example, aromatic vinyl monomers and vinyl cyanate monomers. Examples of aromatic vinyl monomers that can be used include but are not limited to styrene, α-methylstyrene, and vinyl naphthalene, while examples of vinyl cyanate monomers that can be used include but are not limited to (meth)acrylonitrile and substituted acrylonitrile. The aromatic vinyl monomers and vinyl cyanate monomers can be used alone or in combination.

In an embodiment, the amount of the diene monomer or (meth)arcylic ester monomer used is in the range of from 50 weight percent to 100 weight percent and, in another embodiment, from 60 weight percent to 100 weight percent based on the entire weight of the elastomeric material. If the amount of the diene monomer or (meth)arcylic ester monomer to be used for the entire rubber elastomer is less than 50 weight percent, the ability of the polymer particles to toughen a polymer network, such as a cured epoxy matrix, is decreased. On the other hand, the amount of the monomer copolymerizable therewith is, in an embodiment, 50 weight percent or less and, in another embodiment, 40 weight percent or less based on the entire weight of the elastomeric material.

Further, as an ingredient constituting the elastomeric material, a polyfuntional monomer may also be included for controlling the degree of crosslinking. The polyfunctional monomer can include, for example, divinylbenzene, butanediol di(meth)acrylate, triallyl (iso)cyanurate, allyl(meth)acrylic, diallyl itaconate, and diallyl phthalate. The polyfunctional monomer can be used in an amount in the range of from 0 weight percent to 10 weight percent, from 0 weight percent to 3 weight percent in another embodiment, and from 0 weight percent to 0.3 weight percent in yet another embodiment, based on the entire weight of the elastomeric material. In the case where the amount of the polyfunctional monomer exceeds 10 weight percent, the ability of the polymer particles to toughen a polymer network, such as cured epoxy matrix is decreased.

Optionally, a chain transfer agent may be used for controlling the molecular weight or the crosslinking density of the polymer constituting the elastomeric material. The chain transfer agent can include, for example, an alkylmercaptan containing from 5 to 20 carbon atoms. The amount of the chain transfer agent in the recipe is generally in the range of from 0 weight percent to 5 weight percent and, in another embodiment, from 0 weight percent to 3 weight percent based on the entire weight of the elastomeric material. In the case where the amount exceeds 5 weight percent, the amount of the non-crosslinked portion in the rubber particle core increases, which may result in undesired effects on the heat resistance, rigidity, etc. of the composition when it is incorporated into an epoxy resin composition.

A polysiloxane type elastomer may be used in place of the elastomeric material described above as the rubber particle core or in combination therewith. In the case where the polysiloxane type elastomer is used as the rubber particle core, a polysiloxane type elastomer constituted of dialkyl or diaryl substituted silyloxy unit, for example, dimethyl silyloxy, methylphenyl silyloxy, and diphenyl silyloxy can be used. In an embodiment, when using such a polysiloxane type elastomer, a crosslinked structure can be introduced by using a polyfunctional alkoxy silane compound or with radial polymerization of silane compound having a vinylic reactive group.

In an embodiment, the polymer particles can be configured to have an intermediate layer between an elastic core layer and a shell layer. The intermediate layer is formed by using a monomer (hereinafter, sometimes referred to as a "monomer for intermediate layer formation") having two or more polymerizable (radical polymerizable) double bonds in a single molecule. Through one of the double bonds, the monomer for intermediate layer formation is graft-polymerized with a polymer forming the elastic core layer to substantially chemically bond the intermediate layer and the shell layer and, at the same time, through the remaining double bond(s), crosslinking the surface of the elastic core layer. This can improve the grafting efficiency of the shell layer, since many double bonds are arranged in the elastic core layer.

In an embodiment, the intermediate layer is present in an amount of from 0.2 weight percent to 7 weight percent of the polymer particles. The monomer has two or more double bonds and can be selected from the group consisting of (meth)acrylate type polyfunctional monomers, isocyanuric acid derivatives, aromatic vinyl type polyfunctional monomers, and aromatic polycarboxylic acid esters. Radical polymerizable double bonds are more efficient to form a crosslinked layer that covers surface of the elastic core layer. The mass of the monomers forming the intermediate layer equals the mass of the intermediate layer, assuming all the monomers added to the formulation participated in the reaction to form the intermediate layer.

The shell layer can provide the affinity to the rubbery polymer particles for the particles to be stably dispersed in the form of primary particles in the polyol component. The polymer constituting the shell layer is graft polymerized with the polymer constituting the rubber particle core in an embodiment, substantially forming a chemical bond with the polymer constituting the core. For facilitating production of the composition containing the polyol component according to the production process of this invention, at least 70 weight percent in one embodiment, at least 80 weight percent in another embodiment, and at least 90 weight percent in yet another embodiment, of the polymer constituting the shell layer is bonded with the core.

In an embodiment, the shell layer has limited swellability, compatibility or affinity to the polyol component to facilitate mixing and dispersion of the rubbery polymer particles in the resins.

In another embodiment, the shell layer has non epoxide-reactive functional groups, but optionally reactive functional groups capable of forming chemical bonds with epoxy hardeners, such as amines and anhydrides, under conditions where the epoxy resins react with the curing agents are also suitable.

In an embodiment, the polymer constituting the shell layer is a polymer or copolymer obtained by polymerizing or copolymerizing one or more ingredients selected from the group consisting of (meth)arcylic esters, aromatic vinyl compounds, vinyl cyanate compounds, unsaturated acid derivatives, (meth)acrylamide derivatives and maleimide derivatives. Particularly, in embodiments where chemical reactivity is required for the shell layer during curing of the epoxy composition, it is preferred to use a copolymer obtained by copolymerizing one or more of monomers containing one or more of reactive functional groups selected from carboxyl groups, hydroxyl groups, carbon-carbon double bonds, anhydride groups, amino groups or amide groups which can react with the epoxy composition, or a curing agent thereof, or a curing catalyst thereof, etc., in addition to alky(meth)arcylic esters, aromatic vinyl compounds or vinyl cyanate compounds. In an embodiment, the functional group is at least one reactive functional group selected from the group consisting of an epoxy group, a carboxyl group, an amino group, an anhydride group, a hydroxyl group, or a carbon-carbon double bond.

Examples of the (meth)arcylic esters that can be used include, but are not limited to alkyl(meth)acrylate esters such as methyl(meth)acrylate, ethyl(meth)acrylate, butyl (meth)acrylate, and 2-ethylhexyl(meth)acrylate. Examples of the aromatic vinyl compounds include, but are not limited to styrene, α-methylstyrene, alkyl-substituted styrene, and halogen-substituted styrenes such as bromo styrene or chloro styrene. Examples of vinyl cyanate compounds include, but are not limited to (meth)acrylonitrile and substituted acrylonitrile. Examples of the monomers containing the reactive functional group include, but are not limited to 2-hydroxylethyl (meth)acrylate, 2-aminoethyl(meth)acrylate, glycidyl(meth)acrylate, and (meth)acrylate esters having a reactive side chain. Examples of the vinyl ether containing a reactive group include but are not limited to glycidyl vinyl ether and allyl vinyl ether. Examples of the unsaturated carboxylic acid derivatives include but are not limited to (meth)acrylic acid, itaconic acid, chrotonic acid and maleic acid anhydride. Examples of (meth)acrylamide derivatives include, but are not limited to (meth)acrylamide (including N-substituted products). Examples maleimide derivatives include but are not limited to maleicacid imide (including N-substitution products).

The weight ratio of the core layer to the shell layer of a preferred rubber particle is generally in the range of from 40/60 to 95/5, in the range of 50/50 to 95/5 in another embodiment, and is in the range of from 60/40 to 85/15 in yet another embodiment. In a case where the core/shell weight ratio is outside of 40/60 and the amount of the rubber particle core layer is lower than that of the shell layer, then improvement in toughness of an epoxy thermoset containing the rubber particle dispersion tends to be lower. On the other hand, in cases where the ratio is outside of 95/5 and the amount of the shell layer is lower than that of the core layer, it can result in problems in the production process during coagulation and the expected properties may not be obtained.

The rubbery polymer particles can be produced by a well-known method, for example, emulsion polymerization, suspension polymerization, or micro-suspension polymerization. Among them, a production process by the emulsion polymerization is suitable from the view point that it is easy to design composition of the rubbery polymer particles, and it is easy to produce the particles at an industrial scale and maintain quality of the rubbery polymer particles suitable to the process of this invention. As the emulsifying or dispersing agent in an aqueous medium, it is preferred to use those that maintain emulsifying or dispersion stability even in the case where pH of the aqueous latex is neutral. Specifically, they include, for example, nonionic emulsifier or dispersant such as alkali metal salts or ammonium salts of various acids, for example, alkyl or aryl sulfonic acids typically represented by dioctyl sulfosuccinic acid or dodecylbenzene sulfonic acid, alkyl or aryl sulfonic acid typically represented by dodecyl sulfonic acid, alkyl or aryl ether sulfonic acid, alkyl or aryl substituted phosphoric acid, alkyl or aryl ether substituted phosphoric acid, or N-alkyl or aryl sarcosinic acid typically represented by dodecyl sarcosinic acid, alkyl or aryl carboxylic acid typically represented by oleic acid or stearic acid, alkyl or aryl ether carboxylic acids, and alkyl or aryl substituted polyethylene glycol, and dispersant such as polyvinyl alcohol, alkyl substituted cellulose, polyvinyl pyrrolidone or polyacrylic acid derivative. They may be used alone or in combination of two or more.

In another embodiment of the present invention, there is disclosed a composition comprising, consisting of, or consisting essentially of: a) an epoxy resin; b) a hardener; and c) the above-described toughener.

Epoxy Resin

The epoxy resins used in the composition can vary and include conventional and commercially available epoxy resins, which can be used alone or in combinations of two or more, including, for example, novolac resins and isocyanate modified epoxy resins, among others. In choosing epoxy resins for compositions disclosed herein, consideration should not only be given to properties of the final product, but also to viscosity and other properties that may influence the processing of the resin composition.

The epoxy resin component can be any type of epoxy resin useful in molding compositions, including any material containing one or more reactive oxirane groups, referred to herein as "epoxy groups" or "epoxy functionality." Epoxy resins useful in embodiments disclosed herein can include mono-functional epoxy resins, multi- or polyfunctional epoxy resins, and combinations thereof. Monomeric and polymeric epoxy resins can be aliphatic, cycloaliphatic, aromatic, or heterocyclic epoxy resins. The polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example). The epoxies may be pure compounds, but are generally mixtures or compounds containing one, two or more epoxy groups per molecule. In an embodiment, the epoxy resin is prepared from a halogen-containing compound. Typically, the halogen is bromine. In some embodiments, epoxy resins can also include reactive —OH groups, which can react at higher temperatures with anhydrides, organic acids, amino resins, phenolic resins, or with epoxy groups (when catalyzed) to result in additional crosslinking. In an embodiment, the epoxy resin is produced by contacting a glycidyl ether with a bisphenol compound, such as, for example, bisphenol A or tetrabromobisphenol A to form epoxy-terminated oligomers. In another embodiment, the epoxy resins can be advanced by reaction with isocyanates to form oxazolidinones. Suitable oxazolidinones include toluene diisocyanate and methylene diisocyanate (MDI or methylene bis(phenylene isocyanate)).

The composition of the present invention can also be modified by addition of other thermosets and thermoplastics. Examples of other thermosets include but are not limited to cyanates, triazines, maleimides, benzoxazines, allylated phenols, and acetylenic compounds. Examples of thermoplastics include poly(aryl ethers) such as polyphenylene oxide, poly(ether sulfones), poly(ether imides) and related materials.

In general, the epoxy resins can be glycidylated resins, cycloaliphatic resins, epoxidized oils, and so forth. The glycidated resins are frequently the reaction product of a glycidyl ether, such as epichlorohydrin, and a bisphenol compound such as bisphenol A; $C_4$ to $C_{28}$ alkyl glycidyl ethers; $C_2$ to $C_{28}$ alkyl- and alkenyl-glycidyl esters; $C_1$ to $C_{28}$ alkyl-, mono- and poly-phenol glycidyl ethers; polyglycidyl ethers of polyvalent phenols, such as pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene) phenol diglycidyl ether and (chloromethyl) oxirane bisphenol A diglycidyl ether.

In some embodiments, the epoxy resin can include glycidyl ether type; glycidyl-ester type; alicyclic type; heterocyclic type, and halogenated epoxy resins, etc. Non-limiting examples of suitable epoxy resins can include cresol novolac epoxy resin, phenolic novolac epoxy resin, biphenyl epoxy resin, hydroquinone epoxy resin, stilbene epoxy resin, and mixtures and combinations thereof.

Suitable polyepoxy compounds can include resorcinol diglycidyl ether (1,3-bis-(2,3-epoxypropoxyl)benzene), diglycidyl ether of bisphenol A (2,2-bis(p-(2,3-epoxypropoxyl)phenyl)propane), triglycidyl p-aminophenol (4-(2,3-epoxypropoxy)-N,N-bis(2,3-epoxypropyl)aniline), diglycidyl ether of bromobispehnol A (2,2-bis(4-(2,3-epoxypropoxy)3-bromo-phenyl)propane), diglydicylether of bisphenol F (2,2-bis(p-(2,3-epoxypropoxyl)phenyl)methane), triglycidyl ether of meta- and/or para-aminophenol (3-(2,3-epoxypropoxy)N,N-bis(2,3-epoxypropyl)aniline), and tetraglycidyl methylene dianiline (N,N,N',N'-tetra(2,3-epoxypropyl) 4,4'-diaminodiphenyl methane), and mixtures of two or more polyepoxy compounds. A more exhaustive list of useful epoxy resins found can be found in Lee, H. and Neville, K., Handbook of Epoxy Resins, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate. Epoxy resins can also include glycidyl derivatives of one or more of: aromatic diamines, aromatic monoprimary amines, aminophenols, polyhydric phenols, polyhydric alcohols, polycarboxylic acids.

Useful epoxy resins include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl) propane; polyglycidyl ethers of aliphatic and aromatic polycarboxylic acids, such as, for example, oxalic acid, succinic acid, glutaric acid, terephthalic acid, 2,6-napthalene dicarboxylic acid, and dimerized linoleic acid; polyglycidyl ethers of polyphenols, such as, for example, bisphenol A, bisphenol F, 1,1-bis(4-hydroxyphenyl)ethane, 1,1-bis(4-hydroxyphenyl)isobutane, and 1,5-dihydroxy napthalene; modified epoxy resins with acrylate or urethane moieties; glycidlyamine epoxy resins; and novolac resins.

The epoxy compounds can be cycloaliphatic or alicyclic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate;

vinylcyclohexene diepoxide; limonene diepoxide; dicyclopentadiene diepoxide; and the like. Other suitable diepoxides of cycloaliphatic esters of dicarboxylic acids are described, for example, in U.S. Pat. No. 2,750,395.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexyl-methyl-3,4-epoxy-3-methylcyclohexane carboxylate; 3,4-epoxy-5-methylcyclohexyl-methyl-3,4-epoxy-5-methylcyclohexane carboxylate and the like. Other suitable 3,4-epoxycyclohexylmethyl-3,4-epoxycyclohexane carboxylates are described, for example, in U.S. Pat. No. 2,890,194.

Further epoxy-containing materials which are useful include those based on glycidyl ether monomers. Examples are di- or polyglycidyl ethers of polyhydric phenols obtained by reacting a polyhydric phenol, such as a bisphenol compound with an excess of chlorohydrin such as epichlorohydrin. Such polyhydric phenols include resorcinol, bis(4-hydroxyphenyl)methane (known as bisphenol F), 2,2-bis(4-hydroxyphenyl)propane (known as bisphenol A), 2,2-bis(4'-hydroxy-3',5'-dibromophenyl)propane, 1,1,2,2-tetrakis(4'-hydroxy-phenyl)ethane or condensates of phenols with formaldehyde that are obtained under acid conditions such as phenol novolacs and cresol novolacs. Examples of this type of epoxy resin are described in U.S. Pat. No. 3,018,262. Other examples include di- or polyglycidyl ethers of polyhydric alcohols such as 1,4-butanediol, or polyalkylene glycols such as polypropylene glycol and di- or polyglycidyl ethers of cycloaliphatic polyols such as 2,2-bis(4-hydroxycyclohexyl)propane. Other examples are monofunctional resins such as cresyl glycidyl ether or butyl glycidyl ether.

Another class of epoxy compounds are polyglycidyl esters and poly(beta-methylglycidyl) esters of polyvalent carboxylic acids such as phthalic acid, terephthalic acid, tetrahydrophthalic acid or hexahydrophthalic acid. A further class of epoxy compounds are N-glycidyl derivatives of amines, amides and heterocyclic nitrogen bases such as N,N-diglycidyl aniline, N,N-diglycidyl toluidine, N,N,N',N'-tetraglycidyl bis(4-aminophenyl)methane, triglycidyl isocyanurate, N,N'-diglycidyl ethyl urea, N,N'-diglycidyl-5,5-dimethylhydantoin, and N,N'-diglycidyl-5-isopropylhydantoin.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methyl-methacrylateglycidylacrylate and a 62.5:24:13.5 methylmethacrylate-ethyl acrylate-glycidylmethacrylate.

Epoxy compounds that are readily available include octadecylene oxide; glycidylmethacrylate; diglycidyl ether of bisphenol A; D.E.R.™ 331 (bisphenol A liquid epoxy resin) and D.E.R.™ 332 (diglycidyl ether of bisphenol A) available from The Dow Chemical Company, Midland, Mich.; vinylcyclohexene dioxide; 3,4-epoxycyclohexylmethyl-3,4-epoxycyclohexane carboxylate; 3,4-epoxy-6-methylcyclohexyl-methyl-3,4-epoxy-6-methylcyclohexane carboxylate; bis(3,4-epoxy-6-methylcyclohexylmethyl) adipate; bis(2,3-epoxycyclopentyl) ether; aliphatic epoxy modified with polypropylene glycol; dipentene dioxide; epoxidized polybutadiene; silicone resin containing epoxy functionality; flame retardant epoxy resins (such as a brominated bisphenol type epoxy resin available under the trade names D.E.R.™ 530, 538, 539, 560, 592, and 593, available from The Dow Chemical Company, Midland, Mich.); polyglycidyl ether of phenolformaldehyde novolac (such as those available under the tradenames D.E.N.™ 431 and D.E.N.™ 438 available from The Dow Chemical Company, Midland, Mich.); and resorcinol diglycidyl ether. Although not specifically mentioned, other epoxy resins under the tradename designations D.E.R.™ and D.E.N.™ available from The Dow Chemical Company can also be used.

In an embodiment, the epoxy resin can be produced by contacting a glycidyl ether with a bisphenol compound and a polyisocyanate, such as toluene diisocyanate or 'methylene diisocyanate' (the diisocyanate of methylene dianiline), to form oxazolidinone moieties.

Hardener

Any suitable epoxy hardener can be used. Examples of epoxy hardeners that can be used include, but are not limited to aliphatic amines, modified aliphatic amines, cycloaliphatic amines, modified cycloaliphatic amines, amidoamines, polyamide, tertiary amines, aromatic amines, anhydrides, mercaptans, cyclic amidines, isocyanates cyanate esters, and the like. Suitable hardeners include Bis(4-aminocyclohexyl)methane (AMICURE® PACM), diethylenetriamine (DETA), triethylenetetramine (TETA), aminoethylpiperazine (AEP), isophorone diamine (IPDA), 1,2-diaminocyclohexane (DACH), 4,4'-diaminodiphenylmethane (MDA), 4,4'-diaminodiphenylsulfone (DDS), m-phenylenediamine (MPD), diethyltoluenediamine (DETDA), metda-xylene diamine (MXDA), bis(aminomethyl cyclohexane), dicyandiamide, phthalic anhydride (PA), tetrahydrophthalic anhydride (THPA), methyltetrahydrophthalic anhydride (MTHPA), methyl hexahydrophthalic anhydride (MHHPA), hexahydrophthalic anhydride (HHPA), nadic methyl anhydride (NMA), benzophenonetetracarboxylic dianhydride (BTDA), tetrachlorophthalic anhydride (TCPA), and the like, and mixtures thereof.

Polyol Component

The composition includes a polyol component, as described above.

Core Shell Rubber

The composition also includes a core shell rubber, as described above.

Optional Components

Optionally, catalysts may be added to the curable compositions described above. Catalysts may include, but are not limited to, imidazole compounds including compounds having one imidazole ring per molecule, such as imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-methylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']-ethyl-s-triazine, 2,4-diamino-6-[2'-ethyl-4-methylimidazolyl-(1)']-ethyl-s-triazine, 2,4-diamino-6-[2'-undecylimidazolyl-(1)']-ethyl-s-triazine, 2-methyl-imidazolium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole and the like; and compounds containing 2 or more imidazole rings per molecule which are obtained by dehydrating above-named hydroxymethyl-containing imidazole compounds such as 2-phenyl-4,5-dihydroxymethylimidazole, 2-phenyl-4-methyl-5-hydroxymethylimidazole and 2-phenyl-4-benzyl-5-hydroxymethylimidazole; and condensing them with formaldehyde, e.g., 4,4'-methylene-bis-(2-ethyl-5-methylimidazole), and the like.

In other embodiments, suitable catalysts may include amine catalysts such as N-alkylmorpholines, N-alkylalkanolamines, N,N-dialkylcyclohexylamines, and alkylamines where the alkyl groups are methyl, ethyl, propyl, butyl and isomeric forms thereof, and heterocyclic amines.

Other optional components can include defoamers and leveling agents.

Process for Producing the Composition

In an embodiment of the invention, there is disclosed a process for preparing the above-mentioned composition comprising, consisting of, or consisting essentially of dispersing a core shell rubber into a polyol component. In an embodiment, the dispersion is prepared with a high shear mixer in a dispersion zone under dispersion conditions wherein said dispersion zone does not contain a solvent and wherein said dispersion conditions comprise a dispersion temperature of 40° C. to 100° C., a Reynolds Number greater than 10, and a dispersion time of from 30 minutes to 300 minutes.

The core shell rubber is dispersed into a polyol component with a high shear mixer in a dispersion zone. In an embodiment, the high speed mixer is equipped with a variable speed control, a temperature probe and a cowles mixing blade or variations of a cowles. To achieve the best mixing results, the diameter of the cowles mixing blade (D) is generally between 0.2 to 0.7 of the diameter of the vessel (T) (D/T=0.2~0.7), between 0.25 to 0.50 in another embodiment, and between 0.3 to 0.4 in yet another embodiment. The blade clearance from the bottom of the vessel is generally 0.2 D to 2.0 D, 0.4 D to 1.5 D in another embodiment, and 0.5 D to 1.0 D in yet another embodiment. The height of the mixture (H) is generally between 1.0 D to 2.5 D, between 1.25 D to 2.0 D in another embodiment, and between 1.5 D to 1.8 D in yet another embodiment. The dispersion zone does not contain a solvent. The dispersion zone generally has a dispersion temperature in the range of from 0° C. to 100° C. The dispersion zone has a dispersion temperature in the range of from 25° C. to 90° C. in another embodiment, and a dispersion temperature in the range of from 60° C. to 80° C. in yet another embodiment.

The Reynolds number is a measure of the ratio of inertial forces to viscous forces. Generally, the dispersion zone is maintained at a Reynolds number of greater than 10. The dispersion zone is maintained at a Reynolds number of greater than 100 in another embodiment and is maintained at a Reynolds number of greater than 300 in yet another embodiment.

The dispersion zone is maintained at the dispersion conditions for as long as necessary to achieve a uniform, single/discrete particle dispersion. In an embodiment, the dispersion zone is maintained at the dispersion conditions for a time in the range of 30 minutes to 180 minutes. In an embodiment, a vacuum can be applied to remove any entrapped air.

The dispersion zone can also contain a dispersing agent. Examples of dispersing agents include, but are not limited to nonionic emulsifiers or dispersants such as alkali metal salts or ammonium salts of various acids, for example, alkyl or aryl sulfonic acids typically represented by dioctyl sulfosuccinic acid or dodecylbenzene sulfonic acid, alkyl or aryl sulfonic acid typically represented by dodecyl sulfonic acid, alkyl or aryl ether sulfonic acid, alkyl or aryl substituted phosphoric acid, alkyl or aryl ether substituted phosphoric acid, or N-alkyl or aryl sarcosinic acids typically represented by dodecyl sarcosinic acid, alkyl or aryl carboxylic acid typically represented by oleic acid or stearic acid, alkyl or aryl ether carboxylic acids, and alkyl or aryl substituted polyethylene glycols, and dispersants such as polyvinyl alcohols, alkyl substituted cellulose, polyvinyl pyrrolidones or polyacrylic acid derivatives. They may be used alone or in combinations of two or more.

Generally, the dispersing agent described above is used in a small amount, generally less than 5 weight percent, to maintain the required emulsion or dispersion stability during the latex preparation process of the rubbery polymer particles. In an embodiment, the dispersing agent is extracted and removed to a residual amount that would not give undesired effects on the properties of the dispersion composition produced based on this production method.

In an embodiment, the dispersion formed by this process contain 5 weight percent to 45 weight percent of polymer particles. The dispersion formed contains 13 weight percent to 35 weight percent of polymer particles in another embodiment, and contain 25 weight percent to 33 weight percent of polymer particles in yet another embodiment.

Process for Curing the Composition

The dispersions can be used in any typical room temperature cure epoxy systems and elevated temperature cure epoxy systems. The curing conditions the curing conditions depend on the types of epoxy resins and hardeners used.

Cured Product Properties

In an embodiment, the cured product demonstrates improved fracture toughness, in another word, improved ductility of the epoxy thermosets. Depending on the applications, improved toughness can be reflected in better fatigue and delamination resistance in composites, improved lap shear resistance and impact resistance in structural adhesives or electronic adhesives, and improved damage tolerance in coatings.

End Use Applications

The composition can be used for advanced composites, electronics, coatings and structural adhesives. Examples of advanced composites include but are not limited to aerospace composites and automotive composites. Typical electronic applications include but are not limited to electronic adhesives, electrical laminates, and electrical encapsulations.

EXAMPLES

In the following Examples, the following standard analytical equipment and methods are used:

ASTM D5045 for fracture toughness performed on a typical Instron or MTS equipment Glass transition temperature (Tg) is measured by an ARES Rheometer from TA Instruments heated at 3° C./min under 0.1% strain and by a Differential Scanning Calormeters (DSC) from TA Instruments heated at 10° C./min from 0° C. to 250° C.

AR 2000 Rheometer from TA Instrument for viscosity measurements. Viscosity measurements were conducted at 10 Hz from 30° C. to 80° C. at a temperature ramp rate of 3° C./minute.

Raw Materials:

PARALOID™ EXL 2300G: Core shell rubber particles based on butylacrylate core. Supplied by the Dow Chemical Company PARALOID™ EXL 2314: Core shell rubber particles based on butylacrylate core and reactive functionality on the shell. Supplied by the Dow Chemical Company PARALOID™ EXL 2650A: Core shell rubber particles based on butadiene core. Supplied by the Dow Chemical Company PARALOID™ EXL 5766: Core shell rubber particles based on butylacrylate core with particle size at 850 nm Supplied by the Dow Chemical Company Voranol 4701 An EO-capped polyether triol with molecular weight of 4800. Supplied by the Dow Chemical Company Voranol P 4000 A propylene oxide based polyether diol with molecular weight of 4000. Supplied by the Dow Chemical Company Voranol 220-056 A propylene oxide based polyether polyol with molecular weight of 2000. Supplied by the Dow Chemical company FORTEGRA™ 100 A block copolymer of epoxyphilic and epoxyphobic monomers. Supplied by the Dow Chemical Company Voranol 222-029 An EO-capped polyether diol with molecular weight of 4000. Supplied by the Dow Chemical Company PolyG 55-56 An EO-capped polyether polyol with molecular weight of 2000, containing about 45 wt % of EQ. Supplied by Arch Chemicals, Inc.

PolyG 55-28 An EO-capped polyether polyol with molecular weight of 4000, containing about 35 wt % of EQ. Supplied by Arch Chemicals, Inc.

Acclaim 6320 A 6,000-molecular-weight copolymer triol based on propylene oxide and ethylene oxide. Supplied by the Bayer Corporation.

Acclaim 8200 A 8,000-molecular-weight copolymer diol based on propylene oxide. Supplied by the Bayer Corporation.

D.E.R.™ 383: Diglycidyl ether of bisphenol A, supplied by the Dow Chemical Company IPDA: Isophorone diamine, supplied by BASF Company MTHPA: Methyltetrahydrophthalic anhydride, supplied by Dixie Chemical Company NMA: Nadic methyl anhydride, supplied by Dixie Chemical Company Syna Epoxy 21: 3,4-Epoxycyclohexylmethyl-3,4-epoxycyclohexanecarboxylate, supplied by SYNASIA Dispersion Example 1

420 grams of PolyG 55-56 at room temperature was added to a 1 QT open top metal container. The container was then placed under a high shear disperser equipped with a 50 mm diameter Cowles mixer, a variable speed control and a temperature monitor. The Cowles mixer was lowered to allow it to be immersed in the liquid. The height of the mixer to the bottom of the container was kept at 25 to 50 mm 180 grams of PARALOID' EXL 2300G were added to the container gradually while the mixer was running at 1500 rpm. The mixing speed was increased to 2000 rpm after addition of the core shell rubber particles. The Reynolds Number ($N_{RE}$) at the mixing conditions was reported in Table 1. $N_{RE}=D^2N\rho/\mu$, where D is the impeller diameter, N is the impeller revolution per second, $\rho$ is the density of the liquid and $\mu$ is the viscosity of the liquid.

After mixing for 75 minutes, a uniform, low viscosity, off-white dispersion was achieved. The temperature of the dispersion was measured with a thermometer and reported in Table 1. The quality of the dispersion was evaluated by Hegmen grind and microscopy. No agglomeration of the particles was observed. The viscosity of the dispersion was measured by a rheometer and is reported in Table 1.

Comparative Dispersion Example 1

450 grams of Voranol™ 220-056 were added to a 1 QT open top metal container. The container was then placed under a high shear mixer equipped with a 50 mm diameter Cowles mixer, a variable speed control and a temperature monitor. The Cowles mixer was lowered to allow it to be immersed in the liquid. The height of the mixer to the bottom of the container was kept at 25 to 50 mm 150 grams of PARALOID™ EXL 2300G were added to the container gradually while the mixer was running at 1500 rpm. The mixing speed was increased to 2500 rpm after addition of the core shell rubber particles. After mixing for 75 minutes, a high viscosity, white paste was created. The quality of the dispersion was evaluated by Hegmen grind and microscopy. A large amount of agglomeration of particles at the micron scale was observed.

Comparative Dispersion Example 2

450 grams of PolyG 55-28 were added to a 1 QT open top metal container. The container was then placed under a high shear mixer equipped with a 50 mm diameter Cowles mixer, a variable speed control and a temperature monitor. The Cowles mixer was lowered to allow it to be immersed in the liquid. The height of the mixer to the bottom of the container was kept at 25 to 50 mm 150 grams of PARALOID™ EXL 2300G were added to the container gradually while the mixer was running at 1500 rpm. The mixing speed was increased to 2500 rpm after addition of the core shell rubber particles. After mixing for 75 minutes, a high viscosity, white paste was created. The quality of the dispersion was evaluated by Hegmen grind and microscopy. A large amount of agglomeration of particles at micron scale was observed.

Dispersion Example 2

450 grams of PolyG 55-56 was mixed with 150 grams of PARALOID' EXL 2650A using the same mixing parameters described in Dispersion Example 1. After mixing for 75 minutes, a uniform, low viscosity dispersion was achieved. The temperature of the dispersion was measured and reported in Table 1. No agglomeration was observed under Hegmen grind and microscopy. The viscosity of the dispersion is reported in Table 1.

Comparative Dispersion Example 3

450 grams of Voranol™ 220-056 were added to a 1 QT open top metal container. The container was then placed under a high shear mixer equipped with a 50 mm diameter Cowles mixer, a variable speed control and a temperature monitor. The Cowles mixer was lowered to allow it to be immersed in the liquid. The height of the mixer to the bottom of the container was kept at 25 to 50 mm 150 grams of PARALOID™ EXL 2650A were added to the container gradually while the mixer was running at 1500 rpm. The mixing speed was increased to 2500 rpm after addition of the core shell rubber particles. After mixing for 75 minutes, a high viscosity, white paste was created. The quality of the dispersion was evaluated by Hegmen grind and microscopy. A large amount of agglomeration of particles at micron scale was observed.

Comparative Dispersion Example 4

450 grams of PolyG 55-28 were added to a 1 QT open top metal container. The container was then placed under a high shear mixer equipped with a 50 mm diameter Cowles mixer, a variable speed control and a temperature monitor. The Cowles mixer was lowered to allow it to be immersed in the liquid. The height of the mixer to the bottom of the container was kept at 25 to 50 mm 150 grams of PARALOID™ EXL 2650A were added to the container gradually while the mixer was running at 1500 rpm. The mixing speed was increased to 2500 rpm after addition of the core shell rubber particles. After mixing for 75 minutes, a high viscosity, white paste was created. The quality of the dispersion was evaluated by Hegmen grind and microscopy. A large amount of agglomeration of particles at micron scale was observed.

Dispersion Example 3

450 grams of PolyG 55-56 was mixed with 150 grams of PARALOID™ EXL 2314 using the same mixing parameters described in Dispersion Example 1. After mixing for 75 minutes, a uniform, low viscosity dispersion was achieved. The temperature of the dispersion was measured and reported in Table 1. No agglomeration was observed under Hegmen grind and microscopy. The viscosity of the dispersion was reported in Table 1.

Dispersion Example 4

450 grams of PolyG 55-28 was mixed with 150 grams of PARALOID™ EXL 2314 using the same mixing parameters described in Dispersion Example 1. After mixing for 75 minutes, a uniform, low viscosity dispersion was achieved. The temperature of the dispersion was measured and is reported in Table 1. No agglomeration was observed under Hegmen grind and microscopy. The viscosity of the dispersion is reported in Table 1.

Dispersion Example 5

450 grams of FORTEGRA™ 100 was mixed with 150 grams of PARALOID™ EXL 2314 using the same mixing parameters described in Dispersion Example 1. After mixed for 75 minutes, a uniform, low viscosity dispersion was achieved. The temperature of the dispersion was measured and is reported in Table 1. No agglomeration was observed under Hegmen grind and microscopy. The viscosity of the dispersion is reported in Table 1.

Dispersion Example 6

450 grams of Voranol™ P4000 was mixed with 150 grams of PARALOID™ EXL 2314 using the same mixing parameters described in Dispersion Example 1. After mixing for 75 minutes, a uniform, low viscosity dispersion was achieved. The temperature of the dispersion was measured and is reported in Table 1. No agglomeration was observed under Hegmen grind and microscopy. The viscosity of the dispersion is reported in Table 1.

Dispersion Example 7

450 grams of Voranol™ 4701 was mixed with 150 grams of PARALOID™ EXL 2314 using the same mixing parameters described in Dispersion Example 1. After mixing for 75 minutes, a uniform, low viscosity dispersion was achieved. The temperature of the dispersion was measured and is reported in Table 1. No agglomeration was observed under Hegmen grind and microscopy. The viscosity of the dispersion is reported in Table 1.

Dispersion Example 8

450 grams of Voranol™ 222-029 was mixed with 150 grams of PARALOID™ EXL 2314 using the same mixing parameters described in Dispersion Example 1. After mixing for 75 minutes, a uniform, low viscosity dispersion was achieved. The temperature of the dispersion was measured and is reported in Table 1. No agglomeration was observed under Hegmen grind and microscopy. The viscosity of the dispersion is reported in Table 1.

Dispersion Example 9

450 grams of Acclaim 6320N was mixed with 150 grams of PARALOID™ EXL 2314 using the same mixing parameters described in Dispersion Example 1. After mixing for 75 minutes, a uniform, a low viscosity dispersion was achieved. Temperature of the dispersion was measured and is reported in Table 1. No agglomeration was observed under Hegmen grind and microscopy. The viscosity of the dispersion is reported in Table 1.

Dispersion Example 10

450 grams of Acclaim 8200 was mixed with 150 grams of PARALOID™ EXL 2314 using the same mixing parameters described in Dispersion Example 1. After mixing for 75 minutes, a uniform, low viscosity dispersion was achieved. The temperature of the dispersion was measured and is reported in Table 1. No agglomeration was observed under Hegmen grind and microscopy. The viscosity of the dispersion is reported in Table 1.

Plaque Example 1

194.4 grams of D.E.R.™ 383 and 80 grams of Dispersion Example 1 were mixed first via a Speedmixer™ by Hauschild at 2200 rpm for 1 minute. 45.6 grams of IPDA were then added to the mixing cup. After mixing at 2200 rpm for 2 minutes, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 195° C. before it was cooled to room temperature slowly.

Comparative Plaque Example 1

259.2 grams of D.E.R.™ 383 and 60.8 grams of IPDA were added to a mixing cup. After mixing at 2200 rpm for 2 minutes with a Speedmixer™ by Hauschild, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 195° C. before it was cooled to room temperature slowly.

Comparative Plaque Example 2

213.8 grams of D.E.R.™ 383 and 56 grams of PolyG 55-56 were first mixed at 2200 rpm for minute with a Speedmixer™ by Hauschild. 50.2 grams of IPDA were then added to the mixture. After mixing at 2200 rpm for 2 minutes with the Speedmixer™, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 195° C. before it was cooled to room temperature slowly.

Plaque Example 2

207.4 grams of D.E.R.™ 383 and 64.0 grams of Dispersion Example 9 were mixed first via a Speedmixer™ by Hauschild at 2200 rpm for 1 minute. 48.64 grams of IPDA were then added to the mixing cup. After mixing at 2200 rpm for 2 minutes, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 195° C. before it was cooled to room temperature slowly.

Comparative Plaque Example 3

228.1 grams of D.E.R.™ 383 and 38.4 grams of Acclaim 6320N were mixed first via a Speedmixer™ by Hauschild at 2200 rpm for 1 minute. 53.50 grams of IPDA were then added to the mixing cup. After mixing at 2200 rpm for 2 minutes, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 150° C. before it was cooled to room temperature slowly.

Plaque Example 3

119.7 grams of D.E.R.™ 383 and 96 grams of Dispersion Example 9 were mixed first via a Speedmixer™ by Hauschild at 2200 rpm for 1 minute. 104.3 grams of methyltetrahydrophthalic anhydride and 3.2 grams of 1 methylimidazole were then added. After mixing at 2200 rpm for 2 minutes with the Speedmixer™, the mixture was placed in a vacuum chamber to remove any entrapped air. Once the mixture was fully degassed, it was pour into a mold to form a 3.25 mm thick plaque. The mold was immediately placed in a forced air convection oven and cured at 90° C. for 2 hours, followed by 4 hours at 150° C. before it was cooled to room temperature slowly.

Comparative Plaque Example 4

132.5 grams of D.E.R.™ 383 and 72 grams of Acclaim 6320N were mixed first via a Speedmixer™ by Hauschild at 2200 rpm for 1 minute. 115.5 grams of methyltetrahydrophthalic anhydride and 3.2 grams of 1-methylimidazole were then added. After mixing at 2200 rpm for 2 minutes with the Speedmixer™, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 150° C. before it was cooled to room temperature slowly.

Plaque Example 4

119.7 grams of D.E.R.™ 383 and 96 grams of Dispersion Example 7 were mixed first via a Speedmixer™ by Hauschild at 2200 rpm for 1 minute. 104.3 grams of methyltetrahydrophthalic anhydride and 3.2 grams of 1-methylimidazole were then added. After mixing at 2200 rpm for 2 minutes with the Speedmixer™, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 150° C. before it was cooled to room temperature slowly.

Comparative Plaque Example 5

132.5 grams of D.E.R.™ 383 and 72 grams of Acclaim 6320N were mixed first via a Speedmixer™ by Hauschild at 2200 rpm for 1 minute. 115.5 grams of methyltetrahydrophthalic anhydride and 3.2 grams of 1-methylimidazole were added subsequently. After mixing at 2200 rpm for 2 minutes with the Speedmixer™, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 150° C. before it was cooled to room temperature slowly.

Plaque Example 5

99.4 grams of Syna Epoxy 21 and 96 grams of Dispersion Example 10 were mixed first via a Speedmixer™ by Hauschild at 2200 rpm for 1 minute. 124.6 grams of nadic methyl anhydride and 3.2 grams of 1-methylimidazole were then added. After mixed at 2200 rpm for 2 minutes with the Speedmixer™, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 150° C. and 2 hours at 200° C. before it was cooled to room temperature slowly.

Comparative Plaque Example 6

120.8 grams of Syna Epoxy 21 and 48 grams of Acclaim 8200 were mixed first via a Speedmixer™ by Hauschild at 2200 rpm for 1 minute. 151.2 grams of nadic methyl anhydride and 3.2 grams of 1-methylimidazole were then added. After mixing at 2200 rpm for 2 minutes with the Speedmixer™, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 150° C. and 2 hours at 200° C. before it was cooled to room temperature slowly.

Comparative Plague Example 7

142.1 grams of Syna Epoxy 21 and 177.92 grams of nadic methyl anhydride and 3.2 grams of 1-methylimidazole were mixed at 2200 rpm for 2 minutes with the Speedmixer™, the mixture was placed in a vacuum chamber to remove any entrapped air. Once the mixture was fully degassed, it was poured into a mold to form a 3.25 mm thick plaque. The mold was immediately placed in a forced air convection oven and cured at 90° C. for 2 hours, followed by 4 hours at 150° C. and 2 hours at 200° C. before it was cooled to room temperature slowly.

After conditioning at room temperature for about 2 weeks, the plaques made in the above examples were then machined into the appropriate test specimens for measuring fracture toughness and glass transition temperature ($T_g$). Fracture toughness was measured according to ASTM D5045, and glass transition temperature was measured by Dynamic Mechanical Analysis (DMA). Results are reported in Table 2.

TABLE 1

Properties of Dispersion Examples

| Examples | Liquid Viscosity @ 25° C., mPa·S | Mw, Polyol | EO Content, % | $N_{RE,\,2500\,rpm}$ | Dispersion Viscosity @ 30° C., mPa·S |
|---|---|---|---|---|---|
| Dispersion example 1 | 375 | 2000 | 45 | 587 | 1780 |
| Comparative dispersion example 1 | 305 | 2000 | 0 | 341 | Set |
| Comparative dispersion example 2 | 875 | 4000 | 35 | 121 | Set |
| Dispersion example 2 | 375 | 2000 | 45 | 587 | 1170 |
| Comparative dispersion example 3 | 305 | 2000 | 0 | 341 | Set |
| Comparative dispersion example 4 | 875 | 4000 | 35 | 121 | Set |
| Dispersion example 3 | 375 | 2000 | 45 | 587 | 5642 |
| Dispersion example 4 | 875 | 4000 | 35 | 121 | 64790 |
| Dispersion example 5 | 3600 | 6000 | 50 | 30 | 8705 |
| Dispersion example 6 | 980 | 4000 | 0 | 107 | 78570 |
| Dispersion example 7 | 860 | 4800 | 13.5 | 124 | 129100 |
| Dispersion example 8 | 790 | 4000 | 16.9 | 134 | 73580 |
| Dispersion example 9 | 1725 | 6000 | EO-capped | 62 | 26590 |
| Dispersion example 10 | 3000 | 8000 | 0 | 35 | 73970 |

For core-shell rubber particles wherein the shell layer was not modified by reactive functional groups, such as PARALOID™ EXL 2650A and PARALOID™ EXL 2300G, a polyol backbone that contains affinity groups/blocks to the shell layer of the core shell rubber particles, such as ethylene oxide, was critical to achieve stable, low viscosity core shell rubber dispersions.

Surface modification to the shell layer of the core shell rubber particles was a more efficient way to achieve limited affinity between the polyol component and the particles. Surface modifications by glycidyl methacrylate, epoxy groups, carboxyl groups, hydroxyl groups, anhydride groups, amino groups or amide groups are preferred. The surface modified PARALOID™ EXL 2314 was able to form stable dispersions with all the polyol backbones studied.

TABLE 2

Fracture Toughness of the Examples and Comparative Examples

| Examples | Tg ° C. | Fracture Toughness K1c, mPa·m$^{0.5}$ |
|---|---|---|
| Plaque Example 1 | 137 | 1.33 ± 0.09 |
| Comparative Plaque Example 1 | 159 | 0.69 ± 0.05 |
| Comparative Plaque Example 2 | 128 | 1.01 ± 0.03 |
| Plaque Example 2 | 161 | 1.05 ± 0.07 |
| Comparative Plaque Example 3 | 154 | 0.92 ± 0.07 |
| Plaque Example 3 | 124 | 1.08 ± 0.07 |
| Comparative Plaque Example 4 | 125 | 0.97 ± 0.06 |
| Plaque Example 4 | 125 | 1.11 ± 0.09 |
| Comparative Plaque Example 5 | 124 | 0.92 ± 0.07 |
| Plaque Example 5 | 248 | 0.98 ± 0.06 |
| Comparative Plaque Example 6 | 242 | 0.82 ± 0.04 |
| Comparative Plaque Example 7 | 240 | 0.51 ± 0.05 |

Compared to polyol toughened epoxy systems, incorporation of core shell rubber dispersions of polyols into amine cured systems minimizes the decrease of Tg while further improving fracture toughness.

In the case of anhydride cured epoxy systems, a decrease of Tg was observed in systems toughened by both polyol and CSR polyol dispersions when the molecular weight of the polyol was less than 6000. But fracture toughness of the CSR polyol dispersion toughened systems was consistently higher than that of the polyol toughened systems. When the molecular weight of the polyol was more than 6000, no significant drop in Tg was observed, but considerable improvement in toughness was achieved. The CSR polyol dispersion performed better than the polyol alone.

Figure 1:
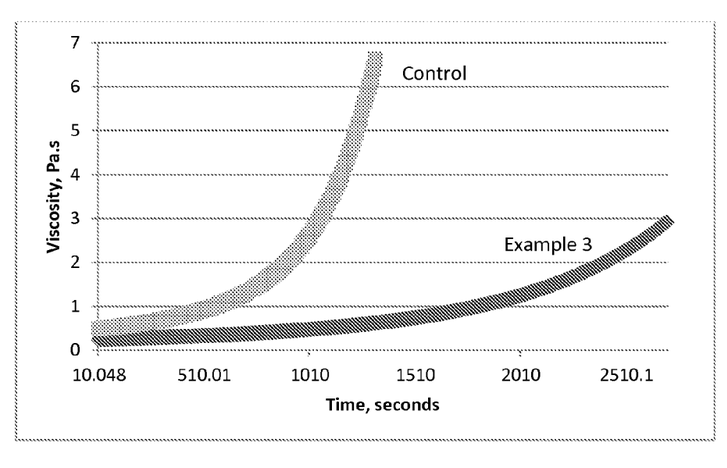
The FIGURE shows viscosity curves of a control, Comparative Plaque Example 1 based on D.E.R.™ 383 and IPDA containing 7.5 weight percent of core-shell rubber particles and a mixture of D.E.R.™ 383 and IPDA containing 30 weight percent of Dispersion Example 3.

Incorporation of core shell rubber dispersions in epoxy systems can modulate reaction and minimize thermal shock, as shown in the FIGURE. The FIGURE shows viscosity curves of Comparative Plaque Example 1 based on D.E.R.™ 383 and IPDA containing 7.5 weight percent of core-shell rubber particles and a mixture of D.E.R.™ 383 and IPDA containing 30 weight percent of Dispersion Example 3. The use of 30 weight percent of Dispersion Example 3 significantly slows down the reactivity of the system, as is evident by the slow build-up of the viscosity.

Example A 382.5 grams of PolyG 55-28 at room temperature was added to a 1 QT open top metal container. The container was then placed under a high shear disperser equipped with a 50 mm diameter cowles mixer, a variable speed control and a temperature monitor. The cowles mixer was lowered to immerse it in the liquid. The height of the mixer to the bottom of the container was kept at 25~50 mm 67.5 grams of PARALOID™ EXL 2300G were then added to the container gradually while the mixer was running at 1500 rpm. The mixing speed was increased to 2000 rpm after addition of the core shell rubber particles. The Reynolds Number ($N_{RE}$) at the mixing conditions was 341.

After mixing for 75 minutes, a uniform, low viscosity, off-white dispersion was achieved. Quality of the dispersion was evaluated by Hegmen grind and microscopy. No agglomeration of the particles was observed. The viscosity of the dispersion was measured at 1100 cps at 30° C. by a rheometer.

Comparative Example B

In the example above, 67.5 grams of PARALOID™ EXL 2300G was replaced by 67.5 grams of PARALOID EXL 5766. After 75 minutes, the dispersion remained grainy.

Agglomeration of the particles was observed under the microscopy and the Hegmen grind.

The invention claimed is:

1. A process for preparing a composition comprising
   a) a polyol component comprising a polyol with an average molecular weight of from 2000 to 12000 and an average functionality of 1.5 to 6; and
   b) a core shell rubber comprising a rubber particle core and a shell layer wherein said core shell rubber has a particle size of from 0.01 μm to 0.5 μm,
   the process comprising dispersing the core shell rubber into the polyol component with a high shear mixer in a dispersion zone under dispersion conditions wherein said dispersion zone does not contain a solvent and wherein said dispersion conditions comprise a dispersion temperature of 40° C. to 120° C., a Reynolds Number greater than 10, and a dispersion time of from 30 minutes to 480 minutes.

2. A process in accordance with claim 1 wherein said core shell rubber comprises a functional group selected from the group consisting of carboxyl groups, hydroxyl groups, carbon-carbon double bonds, anhydride groups, amino groups, amide groups, and combinations thereof.

3. A process in accordance with claim 1 wherein said polyol component is a copolymer selected from the group consisting of ethylene oxide propylene oxide block copolymers, ethylene oxide-butylene oxide block copolymers, ethylene oxide end-capped propylene oxide polyols, ethylene oxide end-capped butylene oxide polyols, and combinations thereof.

4. The process of claim 3 wherein the ethylene oxide content of the copolymer is 30 to 60 weight percent.

5. A process in accordance with claim 1 wherein said polyol component comprises a polyol selected from the group consisting of a polyether polyol, a polyester polyol, a polycaprolactone polyol, a hydroxyl-terminated polybutadiene, and mixtures or copolymers thereof.

6. A process in accordance with claim 1 wherein said dispersion zone further comprises a dispersion agent.

7. A process for forming an epoxy resin composition, comprising dispersing in the absence of a solvent a core-shell rubber comprising a rubber particle core and a shell layer wherein said core shell rubber has a particle size of from 0.01 μm to 0.5 μm into a polyol component comprising a polyol with an average molecular weight of from 2000 to 12000 and an average functionality of 1.5 to 6 to form a dispersion of the core-shell rubber in the polyol component, and then admixing said dispersion with the epoxy resin and a hardener to form the epoxy resin composition.

8. A process in accordance with claim 7 wherein said core shell rubber comprises a functional group selected from the group consisting of carboxyl groups, hydroxyl groups, carbon-carbon double bonds, anhydride groups, amino groups, amide groups, and combinations thereof.

9. A process in accordance with claim 7 wherein the polyol is present in an amount in the range of from 3.0 weight percent to 30.0 weight percent, and the core shell rubber is present in an amount in the range of from 3.0 weight percent to 20.0 weight percent, based on the total weight of the composition.

10. A process in accordance with claim 7 wherein the hardener is selected from the group consisting of aromatic amines, aliphatic amines, cycloaliphatic amines, anhydrides, amidoamines, polyamides and combinations thereof.

11. A process in accordance with claim 7 wherein said polyol component is a copolymer selected from the group consisting of ethylene oxide-proplylene oxide block copolymers, ethylene oxide-butylene oxide block copolymers, ethylene oxide end-capped proplylene polyols, ethylene oxide end-capped butylenes oxide polyols, and combinations thereof.

12. The process of claim 7 wherein the dispersing step is performed by dispersing the core shell rubber into the polyol component with a high shear mixer in a dispersion zone under dispersion conditions, wherein said dispersion zone does not contain a solvent and wherein said dispersion conditions comprise a dispersion temperature of 40° C. to 120° C., a Reynolds Number greater than 10, and a dispersion time of from 30 minutes to 480 minutes.

13. The process of claim 11 wherein the ethylene oxide content of the copolymer is 30 to 60 weight percent.

* * * * *